United States Patent
Fung

(10) Patent No.: US 9,025,459 B2
(45) Date of Patent: May 5, 2015

(54) NETWORK TRAFFIC LOAD BALANCING

(71) Applicant: Hei Tao Fung, Fremont, CA (US)

(72) Inventor: Hei Tao Fung, Fremont, CA (US)

( * ) Notice: Subject to any disclaimer, the term of this patent is extended or adjusted under 35 U.S.C. 154(b) by 286 days.

(21) Appl. No.: 13/862,416

(22) Filed: Apr. 13, 2013

(65) Prior Publication Data

US 2014/0307553 A1    Oct. 16, 2014

(51) Int. Cl.
*H04L 12/803*    (2013.01)

(52) U.S. Cl.
CPC .................. *H04L 47/125* (2013.01)

(58) Field of Classification Search
CPC .................................. H04L 47/125
USPC ........................................ 370/235
See application file for complete search history.

(56) References Cited

U.S. PATENT DOCUMENTS

| | | | |
|---|---|---|---|
| 8,358,597 B2 | 1/2013 | Fung | |
| 8,830,835 B2 * | 9/2014 | Casado et al. | 370/235 |
| 8,964,563 B2 * | 2/2015 | Jocha et al. | 370/236.2 |
| 2014/0307580 A1 * | 10/2014 | Fung | 370/254 |

* cited by examiner

*Primary Examiner* — Jung Park
*Assistant Examiner* — Albert Shih

(57) ABSTRACT

A system and methods of using commodity switches and commodity servers to produce a load-balanced, highly-available network for a computing cloud are disclosed. The system comprises switches and servers. The switches are organized in tiers. The switches in the highest tier are connected to the servers via uplink switch ports. The switches in the lowest tier are connected to devices external to the system via downlink switch ports. A packet received from any downlink switch port is forwarded to one of the at least one link aggregation of uplink switch ports. A packet received from any uplink switch port is forwarded according to the first label in the packet. A server is configured to insert one or more labels in a packet to be sent out via the switches. A value in a label indicates the switch port to be selected to send out the packet received at a switch.

20 Claims, 11 Drawing Sheets

NETWORK TRAFFIC LOAD BALANCING

FIELD OF THE INVENTION

This application related to data communications and more particularly to network traffic load balancing.

BACKGROUND

Cloud computing is the use of computing resources, hardware and software, that are delivered as a service over a network. The main enabling technologies for cloud computing are virtualization and self-managed or autonomic computing. Virtualization refers to the creation a virtual machine which acts like a real computer with an operating system. A host machine is the actual machine on which the virtualization takes place, and a guest machine is the virtual machine. The software or firmware that creates a virtual machine on the host machine is called a hypervisor.

Software defined networking (SDN) is an approach to building a computer network that separates and abstracts elements of the networking systems. It has become more important with the emergence of virtualization where virtual machines (VMs) may be dynamically spawned or moved, to which the network needs to quickly respond. SDN decouples the system that makes decisions about where traffic is sent (i.e., the control plane) from the system that forwards traffic to the selected destination (i.e., the data plane). OpenFlow is a communications protocol that enables the control plane to access and configure the data plane.

Recently, there have been commodity OpenFlow Ethernet switches in the market. Those switches are relatively low-cost, but they also have severe limitations in terms of the number of classification entries and the variety of classification keys. Supposedly, an OpenFlow device offers the ability of controlling the traffic by flows. The severe limitations of those switches greatly discount the ability because the number of flows that can be configured on those switches is relatively small, e.g. in thousands. Those limitations are inherent in the hardware designed and have nothing to do with OpenFlow, and OpenFlow is still good for enabling the control plane to configure the data plane. However, the assumption that the control plan can configure many (e.g. millions) of flows via OpenFlow or even any other communications protocol functionally similar to OpenFlow to the data plane may not hold. In this invention, we disclose a system and methods of using commodity switches and commodity servers to produce a load-balanced, redundant network for a computing cloud, taking into considerations the limitations of the commodity switches and the requirements of high availability.

SUMMARY OF THE INVENTION

An object of the invention is to produce a load-balanced, highly-available network from commodity Ethernet switches and commodity servers.

The system comprises a plurality of switches and a plurality of servers. The switches are organized in tiers. Each switch comprises uplink switch ports and downlink switch ports. The switch is connected to switches in higher tiers via uplink switch ports and to switches in lower tiers via downlink switch ports. The switches are connected to the servers via uplink switch ports. The switches are connected to the devices external to the system via downlink switch ports. A management module may provide the capability of provisioning and configuring the servers and the switches. On each switch, at least one link aggregation is configured with the uplink switch ports. A packet received from any downlink switch port is forwarded to one of the at least one link aggregation of uplink switch ports. A packet received from any uplink switch port is forwarded according to the first label in the packet. A server is configured to insert one or more labels in a packet to be sent out via the switches. A value in a label indicates the switch port to be selected to send out the packet received at a switch port.

It is also an object of the invention that the network is able to allow any device external to the system to reach any other device external to the system.

It is also an object of the invention that the network is able to allow any server in the system to reach any device external to the system.

It is also an object of the invention that the network is able to allow any server in the system to reach any other server in the system.

It is also an object of the invention that the network is able to allow any server in the system to multicast to one or more devices external to the system.

It is also an object of the invention that the applications or services may be hosted on the servers in the system or on the devices external to the system or both.

The invention addresses the typical requirements on a computing cloud, namely scalability, high-availability, and efficiency. The system is scalable because more servers and switches may be added to provide higher capacity. The system is highly-available because there can be built-in redundancy in connectivity and capacity and a failure in a switch port, a switch, or a server can be alleviated by responding quickly in leveraging the redundancy. The system is efficient because of its ability in load-balancing the traffic taking advantage of the redundancy.

Moreover, the invention addresses some practical limitations in provisioning and configuring the switches and servers of the system. The limitations include the number of classification entries available on the switches and the non-negligible time in reconfiguring the switches and servers in case of failure. Our invention requires only tens or hundreds of classification entries on a switch. That is well within the capability of low-cost commodity switches in the market. Also, re-configuring the switch takes time which is not negligible in view of high-availability requirement, but our system requires minimal re-configuration of the switches and servers in response to failure. Also, it requires only standardized functions of the switch. There is no need for new hardware or switch chips other than what has been already available in the market. Also, it requires no new functionality or adaptation in the devices external to the system.

BRIEF DESCRIPTION OF THE DRAWINGS/FIGURES

The present disclosure will be understood more fully from the detailed description that follows and from the accompanying drawings, which however, should not be taken to limit the disclosed subject matter to the specific embodiments shown, but are for explanation and understanding only.

DETAILED DESCRIPTION OF THE INVENTION

The system comprises a plurality of switches and a plurality of servers. A management module may be used to provision and configure the switches and servers. The switches are organized in tiers. There should be at least one tier. To scale the system, however, there should be multiple tiers. A switch has a limited number of switch ports. In other words, there are a limited number of connections that can be made to a switch. To support many external devices connected to the system, the system should have many switches. The switches should be interconnected to provide communications among the many external devices. Organizing the switches in tiers would achieve inter-connectivity. Packets from a device external to the system may enter a switch in the lowest tier and be forwarded to a switch in a higher tier, then eventually to a server. At the server, the packets may be processed or unprocessed and then forwarded to a switch in the highest tier, then to another switch in the lower tier, and finally to another device external to the system. Usually, a switch in a higher tier has larger capacity than a switch in a lower tier. A switch in a higher tier aggregates the traffic from switches in a lower tier.

Each switch comprises uplink switch ports and downlink switch ports. The switch is connected to switches in higher tiers via uplink switch ports and to switches in lower tiers via downlink switch ports. A switch port cannot be both an uplink switch port and a downlink switch port at the same time.

In our preferred embodiment, the switches in the highest tier are connected to the servers via uplink switch ports, and the servers are connected only to the switches in the highest tier. The switches in the lowest tier are connected to the devices external to the system via downlink switch ports, and the external devices are connected only to the switches in the lowest tier.

In another embodiment, the servers can be connected to uplink switch ports of switches in any tier, and the devices external to the system can be connected to downlink switch ports of switches in any tier. The methods to be disclosed are still applicable. Sometimes, it is even desirable to have external devices connected to downlink switch ports of switches in higher tiers because those downlink switch ports may have a higher bandwidth than the downlink switch ports of the switches in the lowest tier.

Using our preferred embodiment, we may conceptually partition the system into a virtualized server and a virtualized switch. The virtualized server comprises the servers in the system. The virtualized switch comprises the switches in the system. The virtualized server is connected to the virtualized network in the north end while the external devices are connected to the virtualized switch in the south end.

Figure 1:
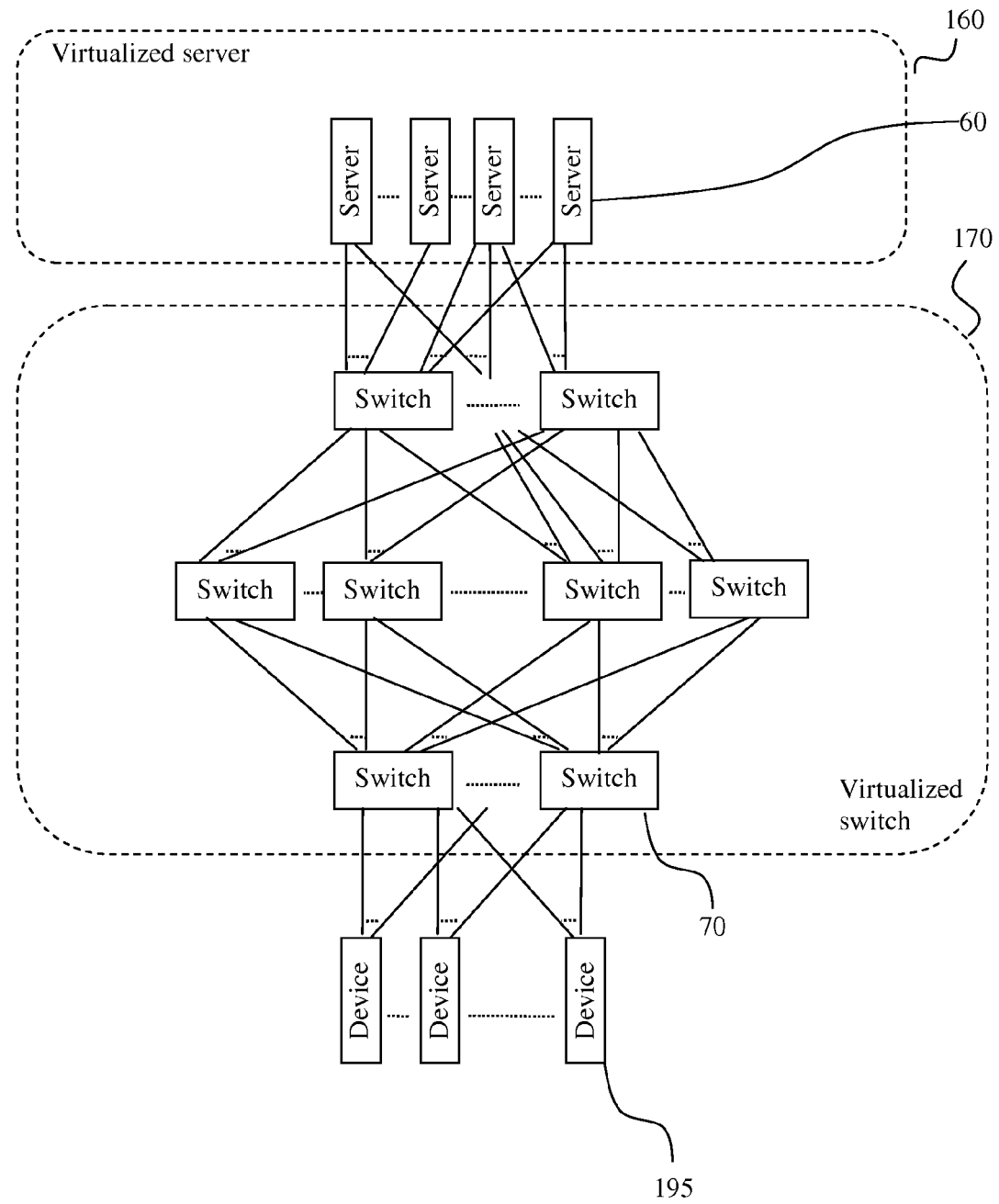
FIG. 1 illustrates an embodiment of the system disclosed.

FIG. 1 illustrates one embodiment of the system. There are three tiers of switches in the virtualized switch 170. The virtualized server 160 is connected to the virtualized switch 170 in the north end. The external devices 195 are connected to the virtualized switch 170 in the south end. A server 60 may or may not be connected to multiple switches. A server connecting to multiple switches provides the advantage that there may be a second communications path in case of a switch failure. Similarly, an external device 195 may or may not be connected to multiple switches.

A server typically means a host machine. A host machine may provide applications or services by itself or may support one or more virtual machines on which applications or services are provided. In the latter case, we may also consider a virtual machine as a logical server. In this disclosure, the focus is not on whether the server is physical or logical. Therefore, in this disclosure, the term server may mean a physical server or a logical server.

An external device may be a switch, a router, a server, a computer, or other network-capable equipment. It may even represent a virtual device such as a VM on a server. An external device is considered to be an element outside the system because it plays no role in the network traffic load balancing. The external devices may be in need of services or applications provided by the virtualized server of the system or provided by other external devices connected to the system.

Figure 2A:
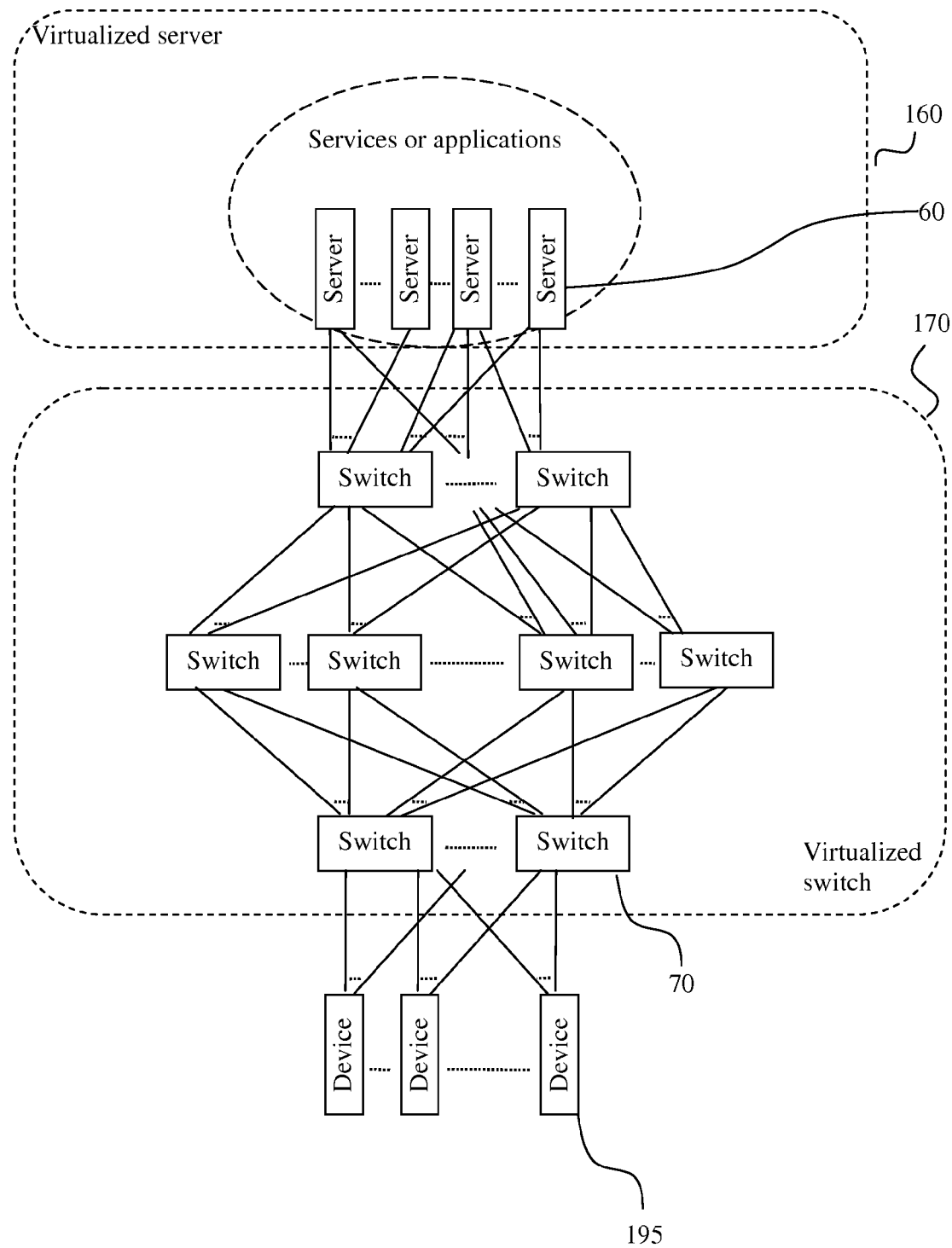
FIG. 2a illustrates one deployment scenario of the system disclosed.

FIG. 2a illustrates one deployment scenario of the system. Some external devices would like to use the services or applications hosted on the virtualized server. The external devices do not care about communicating to a specific server. They may not be aware of which specific server actually servicing them. They just know that the services are provided by the virtualized server. When the demand on the services increases, the capacity of the virtualized server can be increased by adding more servers to the virtualized server and perhaps more switches to the virtualized switch for connectivity. In this case, an external device 195 sends packets to a downlink switch port of a switch at the lowest tier. The packets find a path in the virtualized switch to a server 60 in the virtualized server. The server 60 sends packets to the external device 195, via the same or different path in the virtualized switch. When there are many external devices doing the same at the same time, the disclosed system is able to spread the traffic throughout the switches and the servers. Furthermore, when a server, a switch port, or a switch goes down, the disclosed system is able to redistribute the traffic affected by the failure.

Figure 2B:
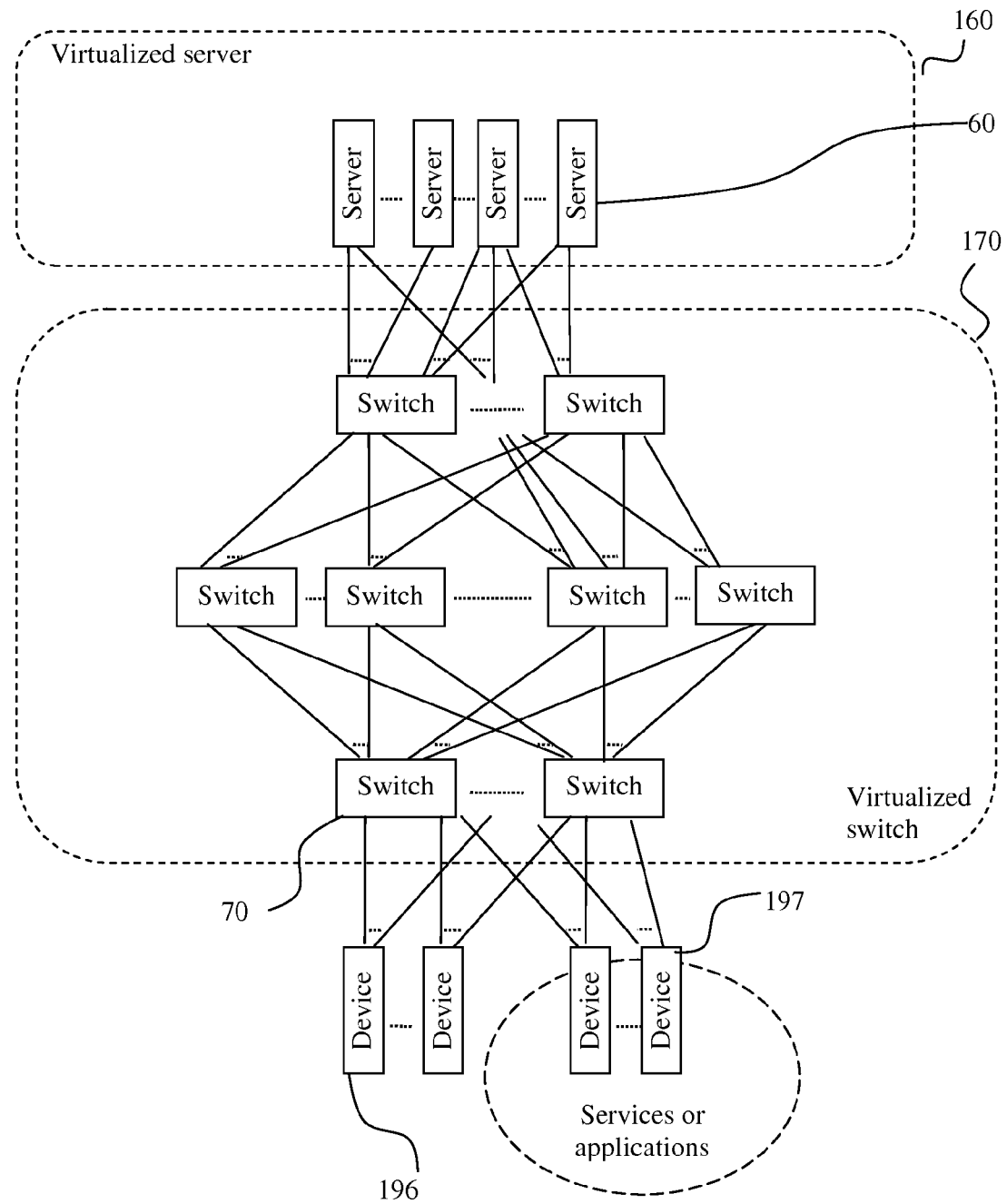
FIG. 2b illustrates another deployment scenario of the system disclosed.

FIG. 2b illustrates another deployment scenario of the system. Some service-client external devices would like to use the services or applications hosted on some service-providing external devices. The service-client external devices do not care about communicating to a specific service-providing external device. They just know that the services are provided by a group of service-providing external devices and care about reaching out to the group. In this case, a service-client external device 196 sends packets to a downlink switch port of a switch at the lowest tier. The packets find an uplink path in the virtualized switch to a server 60 in the virtualized server. Depending on the use case, the server 60 may or may not modify the packets. The server 60 forwards the packets back to a service-providing external device 197 via a downlink path in the virtualized switch. On the other hand, the service-providing external device 197 may send packets back the service-client external device 196 via the same or different server in the virtualized server. The path from the service-client external device to the virtualized server, the path from the virtualized server to the service-providing external device, the path from the service-providing device to the virtualized server, and the path from the virtualized server to the service-client external device are independent and are likely to be different. When there are many external devices doing the same at the same time, the disclosed system is able to spread the traffic throughout the switches and the servers. Furthermore, when a server, a switch port, or a switch goes down, the disclosed system is able to redistribute the traffic affected by the failure.

The switches in our system are preferred to be Ethernet switches for the reasons of cost and ubiquity. Typical switches are capable of forwarding traffic by packet classification and performing actions on a packet including sending out the packet on a specified port and removing a header from the packet. The packet classification is usually performed via a TCAM (Ternary Content Addressable Memory). A TCAM consists of a number of entries, whose positions indicate the preferences of the entries. A lookup key is formed out of the content of a packet, e.g., the headers of a packet. A lookup using the lookup key is launched on all TCAM entries. Though there may be one or more hits in the same lookup, the entry in the most preferred position will be selected, and the resulting action associated with the entry will be performed on the packet. TCAM is considered a precious resource on a switch, and a low-cost switch may support a small number of TCAM entries, for example, in the range of thousands. Traffic load balancing can be achieved by classifying traffic into flows using TCAM. However, a typical computing cloud can easily have more than thousands of flows where a flow is identified by the five tuples comprising destination IP address, source IP address, protocol, source port number and destination port number.

The management module provides the capability of provisioning and configuring the servers and the switches. Provisioning generally includes some operations in addition to configuring such as cabling. Configuring may include the manual operations and the automatic and dynamic operations of setting up functional rules on the elements. In this invention, a preferred embodiment is performing the disclosed method automatically as executing pre-programmed instructions on a processor. Another embodiment is performing the disclosed method partially manually and partially automatically although manual operations would be burdensome on a human operator. Considering the possibility of various embodiments, we simply use the term configuring in a broad sense to provide room for accommodating various embodiments. The management module is a physical or logical entity able to configure the switches and the servers. The management module can be a physical machine connected to the virtualized switch. The management module can also be a virtual machine running on a physical machine connected to the virtualized switch. The management module can also be a virtual machine or physical machine connected to the servers and switches in the system via an external network. The management module can also be a virtual machine running on a server within the virtualized server. The management module can also be a software module running on a switch within the virtualized switch. Regardless of the embodiment, it is vital, however, that the management module has communication connectivity to the switches and the servers so that it can configure the switches and the servers. From OpenFlow viewpoint, it can be considered as an OpenFlow controller. In our preferred embodiment, the management module can configure the switches and servers via OpenFlow, but any other protocol similar to OpenFlow may be used.

The disclosed method comprises several key steps. The steps do not need to be performed sequentially nor in the described order. Performing them enables distribution of traffic from the external devices to the virtualized server and vice versa. The steps include: configuring link aggregations of uplink switch ports, referred to as uplink link aggregations; configuring forwarding rules on the switches to forward packets received from downlink switch ports to the uplink link aggregations; configuring the servers to insert labels into packets to be sent; and configuring forwarding rules on the switches to forward packets received according to the labels.

To enable traffic distribution from the external devices towards the virtualized server requires the step of configuring link aggregations of uplink switch ports and the step of configuring forwarding rules on the switches to forward packets received from downlink switch ports to the link aggregations.

On each switch, at least one link aggregation is configured with its uplink switch ports. A link aggregation of switch ports behaves like a logical switch port. Traffic entering a member switch port is considered entering the link aggregation. The switch sends out traffic on the link aggregation via only one member switch port of the link aggregation. The member switch port selected for a specific packet is typically based on a hash value of the headers of the specific packet. Consequently, a link aggregation spreads its egress traffic over its member switch ports. A typical switch nowadays supports link aggregation. It typically supports a small number of link aggregation traffic distribution algorithms. It also typically supports quick link failover by that it automatically and quickly detects a link failure and automatically redistributes traffic affected by a failing member switch port quickly to the operational member switch ports. Often, a typical switch poses a limitation on the number of member switch ports to be included in one link aggregation. When a switch in our system has the number of uplink switch ports exceeding the limitation, it requires configuring more than one link aggregation on the switch. A link aggregation is allowed to have a single member switch port, but in that case, there is no benefit of the quick link failover. We refer to a link aggregation of uplink switch ports as an uplink link aggregation.

On each switch, forwarding rules are configured to forward a packet received from any of its downlink switch ports to one of the one or more uplink link aggregations on the switch. The selection of which one of the one or more uplink link aggregations for a specific packet is based on the content of the specific packet. The forwarding rules describe what content of the packet to look at. The forwarding rules can be implemented using the classification TCAM of the switch. A switch performs a classification lookup and forwards the packet according to the lookup result.

Figure 3:
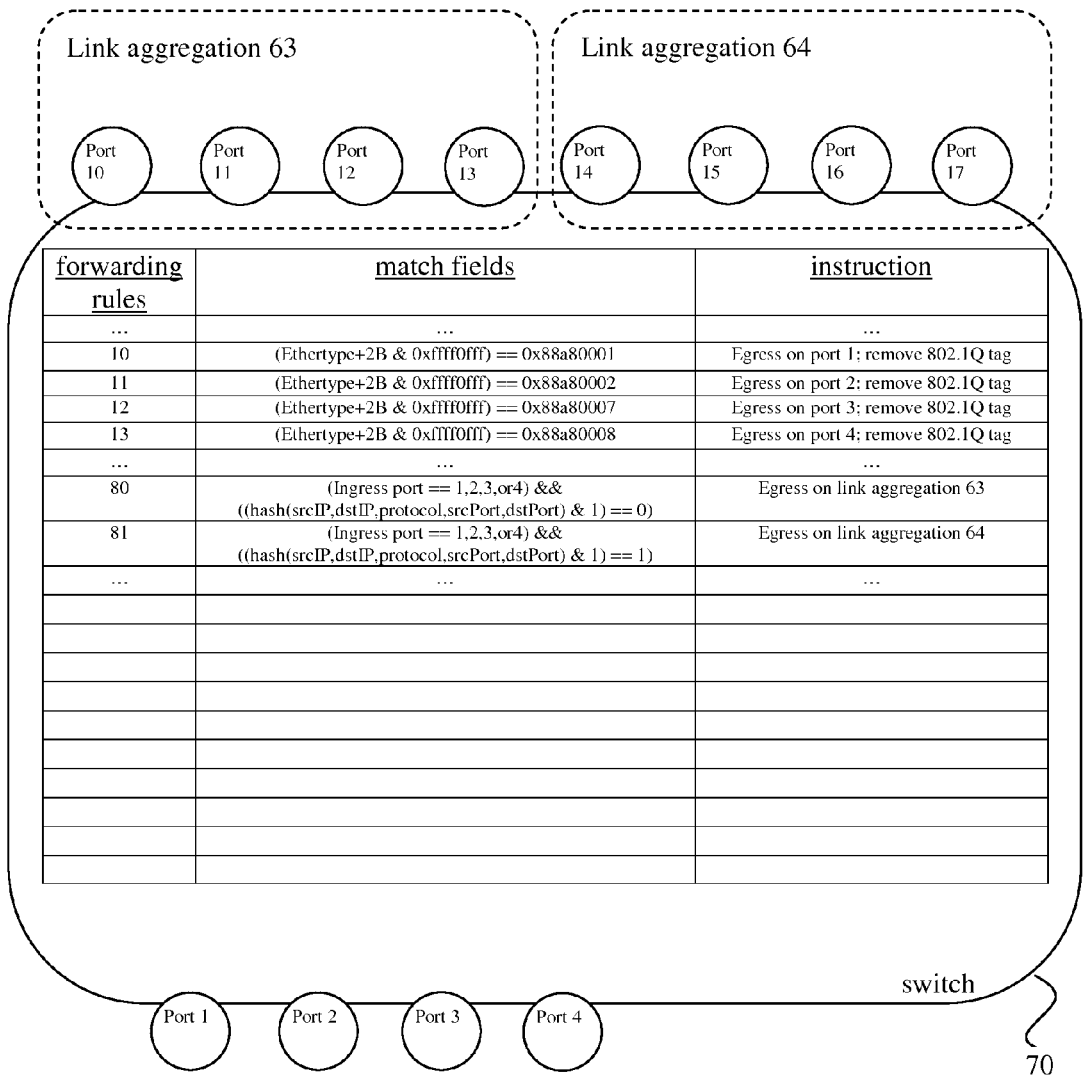
FIG. 3 illustrates an embodiment of forwarding rules on a switch.

FIG. 3 illustrates an embodiment of the forwarding rules to be configured on a switch. The forwarding rules 80-81 state that a packet received from any of ports 1-4, which are downlink switch ports, is to be forwarded to one of the two uplink link aggregations 63 and 64. The uplink link aggregation 63 comprises uplink switch ports 10-13, and the uplink link aggregation 64 comprises uplink switch ports 14-17. The forwarding rules 80-81 select an uplink link aggregation based on whether a hash value of the source IP address, the destination IP address, the IP protocol, the source port, and the destination port is even or odd. It is desirable that the algorithm of selecting a link aggregation among the link aggregations and the algorithm of selecting a member switch port within a link aggregation are different. Otherwise, traffic distribution within a link aggregation may be skewed towards certain member switch ports.

When an uplink link aggregation is added, deleted, going up, or going down, the forwarding rules need to be re-configured so that traffic may be redistributed over the operational uplink link aggregations. To reduce the frequency of re-configuring the forwarding rules which is a time-critical operation in view of high-availability, an uplink link aggregation had better consist of at least two member switch ports, and the member switch ports had better be connected to two or more higher tier switches or servers. A link aggregation with failed member switch ports but at least one operational switch port is still operational and can carry traffic meant for the failed member switch ports. As in FIG. 3, any single failure among ports 10-17 can be handled without reconfiguring the forwarding rules. It is advantageous that an uplink link aggregation has member switch ports connected to more than one switch in the higher tiers. When one of the connected switches in the higher tiers goes down and subsequently some member switch ports of the uplink link aggregation go down, the uplink link aggregation remains operational.

The combination of the two aforementioned steps achieves uplink traffic distribution with a small number of forwarding rules and responsiveness to a failure on a switch port, a switch, or a server.

To enable traffic distribution from the virtualized server towards the external devices requires the step of configuring the servers to insert labels into packets to be sent and the step of configuring forwarding rules on the switches to forward packets received according to the labels in the packets.

The limitation of not being able to configure many forwarding rules on the switches limits the ability in controlling which server among the servers to receive the uplink traffic from an external device. Therefore, it is vital for a server to be able to send packets to any of the external devices. To meet that objective, there should be a fine control over directing the packets from the servers to the external devices through the virtualized switch. In our preferred embodiment, a server in the virtualized server is configured to be able to insert one or more labels into a packet to be sent out to an external device. Each label indicates the switch port to be selected to forward the packet out among switch ports of the switch that receives the packet. A stack of labels together specifies a path comprising the egress switch ports of the switches along the path. The step of configuring a server to insert labels into a packet to be sent enables the server to specify the path of a packet through the virtualized switch. There may exist a number of alternate paths from a server to an external device. The function of discovering the paths from servers to external devices is best to be performed by the management module. The discovery can be achieved by the management module injecting a specific packet to a switch and directs the specific packet out on a specific switch port of the switch. Another switch that receives the specific packet is configured to forward the specific packet to the management module along with the information about the receiving switch port of the receiving switch. The management module may use OpenFlow for injection of packet to a switch and for capturing a packet from a switch. The management module may perform the discovery on every switch port of every switch and thereby understand the network topology. The management module may then determine the switch ports to be the uplink switch ports or the downlink switch ports. The management module thereby knows the paths between the servers and the external devices. The selection of a path may be based on a shortest path algorithm or based on traffic load or both. The information about the stack of labels associated with an external device should be configured on a server. Also, when the path is no longer available, the affected servers should be reconfigured to use other paths.

Each switch is configured with forwarding rules to forward packets received according to the labels. Each switch is to forward a packet received from any of its uplink switch ports out on at least one of its downlink switch ports. The at least one of the downlink switch ports is selected based on the first label in the packet received. The switch is also to remove the first label from the packet, exposing a second label if there is. That is so that the next switch receiving the packet will do the forwarding based on the then first label in the packet.

In FIG. 3 the forwarding rules 10-13 are for forwarding packets to downlink switch ports based on labels.

Each forwarding rule maps a label value to a switch port. In a simple embodiment, the label values are directly mapped to switch port numbers where the switch port number can be implied from the label value, e.g., label value M indicating switch port M. In a more sophisticated embodiment, the label values are mapped one-to-one to switch ports, e.g., label value M indicating switch port N. Switches are likely to differ in their numbering of their own downlink switch ports and uplink switch ports. Therefore, the mapping of label values to switch ports can be different on different switches.

In one embodiment, the label is an IEEE 802.1Q tag. The 802.1Q tag comprises a VID (Virtual Local Area Network Identifier) field, which is supposed to indicate a VLAN (Virtual Local Area Network) identifier associated with the packet. In our case, the switches are configured to interpret the VID value as an indication of the at least one egress switch port selected. That is, the VID value is the label value indicating the egress switch port(s). The 802.1Q tag also comprises a user priority field to indicate the forwarding priority of the packet. The 802.1Q tag also comprises a Tag Protocol Identifier (TPID) field. We prefer using 0x88a8 as the TPID over other values including 0x8100 and 0x9100. The 802.1Q tag in a packet is found at the position of the Ethertype field and the next two bytes.

The mapping of label values to switch ports is exhibited in the forwarding rules. In FIG. 3, forwarding rule 10 maps VID value 1 to switch port 1; forwarding rule 11 maps VID value 2 to switch port 2; forwarding rule 12 maps VID value 7 to switch port 3; forwarding rule 13 maps VID value 8 to switch port 4.

In another embodiment, the label is an MPLS (Multiprotocol Label Switching) label. The MPLS label has a 20-bit field, which can be used as the label value indicating the egress switch port(s).

Figure 4:
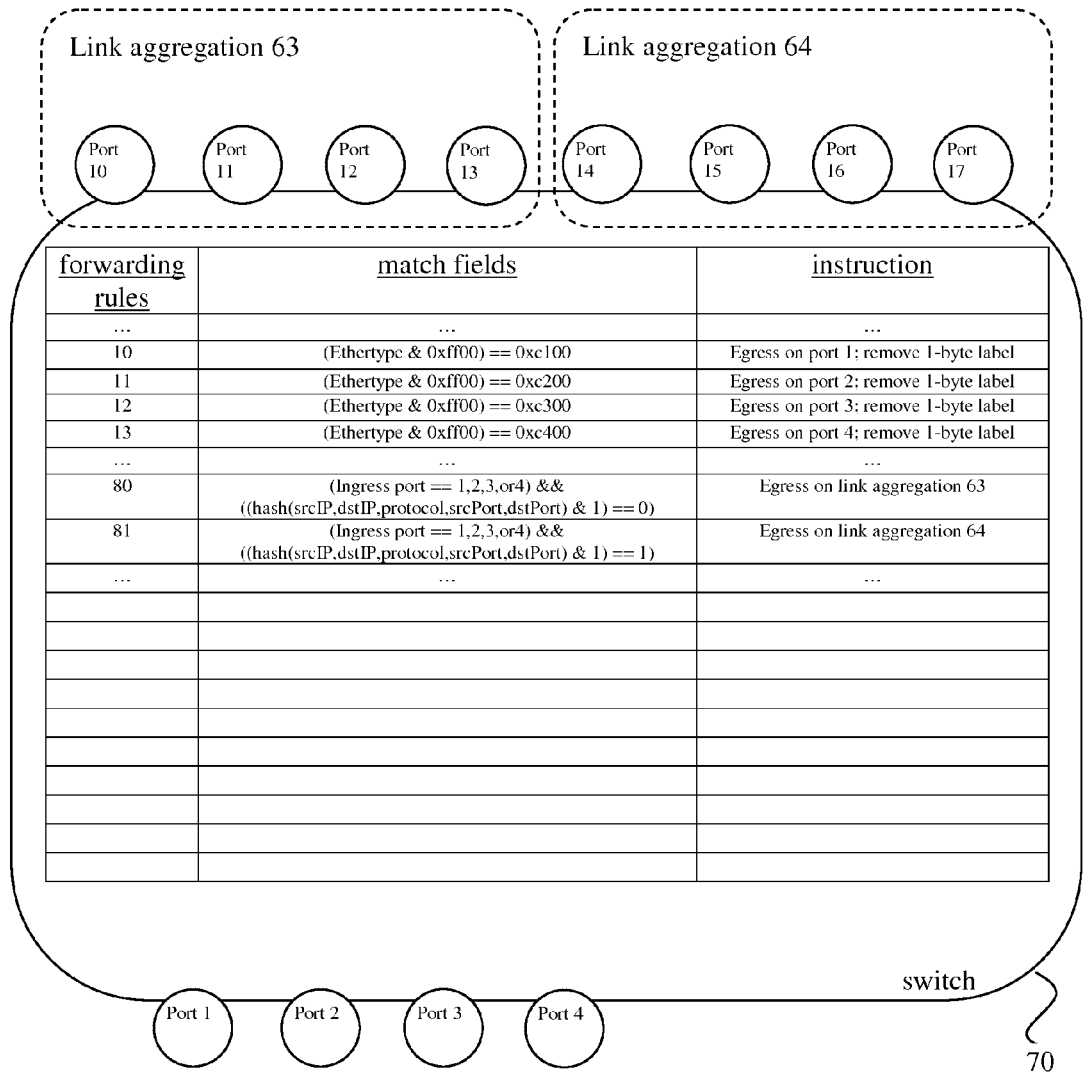
FIG. 4 illustrates another embodiment of forwarding rules on a switch.

In yet another embodiment, the label is a non-standardized, special construct. It is a one-byte field inserted immediately after the source MAC address field and immediately before the Ethertype field in a packet. That is to say, the one-byte field occupies the original position of the Ethertype field. The Ethertype field is to indicate the protocol carried in the Ethernet packet. For example, for an IP (Internet Protocol) packet the Ethertype field value is 0x0800, and for 802.1ad packet the Ethertype field value is 0x88a8. All Ethertype values in use are registered with the IEEE (Institute of Electrical and Electronics Engineers) organization. The one-byte field comprises '11' as the two most significant bits and a 6-bit value for indicating the egress switch port. The leading bits '11' are chosen so as to make the apparent Ethertype field value to indicate an unavailable protocol because Ethertype values between 0xc0000 and 0xffff are unregistered or not public. Our intention is such that a packet with the label can be treated as special as opposed to being a normal packet. In other words, a packet with such a label can be easily differentiated from a packet without the label. FIG. 4 illustrates the use of the one-byte label in forwarding rules 10-14.

There is an advantage of using the aforementioned one-byte label. A stack of four labels is only four-byte. A stack of four labels enables a packet to go through four tiers of switches, and four tiers of switches are quite sufficient in many deployment scenarios. The stack of four labels occupies the position of an 802.1Q tag in a packet. OpenFlow supports classification of flow by 802.1Q tag parameters. Therefore, we may conveniently leverage OpenFlow to configure forwarding rules based on the stack of four labels. Also, we may just need to have the switches in the lowest tier to remove the stack of four labels in a packet in one shot while the switches in the higher tiers need not remove any of the four labels in the packet. In the case that there are fewer than four tiers of switches, the stack of four labels can also be used though at least one of the four labels will be bogus and have no impact on the path of a packet. In the case that there are more than four tiers of switches, two or more stacks of four labels can be used. Then the fourth next switch in the path needs to remove the first stack of four labels in a packet to expose the next stack of four labels in the packet to switches in the lower tiers, and a switch in the lowest tier needs to remove the last stack of four labels in the packet.

A stack of four one-byte labels can be viewed as one type of super labels. A super label comprises egress switch port selection information for more than one tier of switches. A super label is one kind of labels. A super label should be small in size. It is desirable to be four-byte like the size of an 802.1Q tag. To follow the aforementioned rationale, an embodiment of a super label may be a four-byte field inserted immediately after the source MAC address field in the packet. The super label may comprise '11' as the two leading bits so that the apparent Ethertype of the packet indicates an unavailable protocol. The super label may comprise four six-bit fields to indicate egress switch ports in four tiers of switches. The super label may even comprise three bits indicating forwarding priority of the packet. The forwarding rules of a switch in a tier are configured just to focus on fields relevant to the tier. In the case that there are more than four tiers of switches, two or more super labels can be used. Then a switch in the fourth highest tier needs to remove the first super label in a packet to expose the next stack of four labels in the packet to switches in the lower tiers, and a switch in the lowest tier needs to remove the last super label in the packet.

Figure 5A:
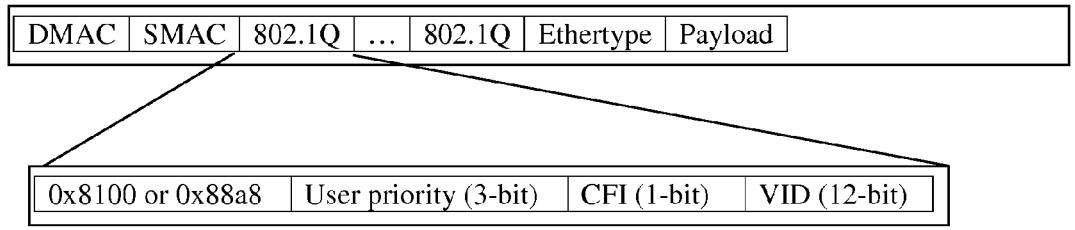
FIG. 5a-5c illustrate different embodiments of a label.
Figure 5B:
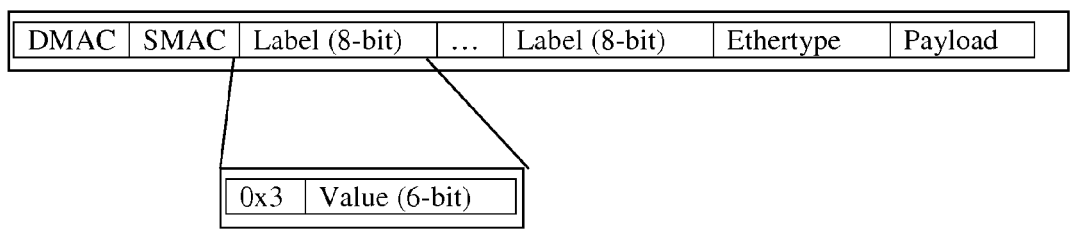
Figure 5C:
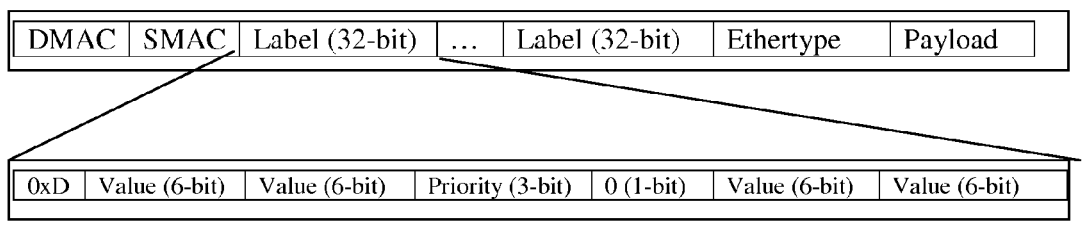

FIG. 5a illustrates a stack of 802.1Q tags in a packet and the format of an 802.1Q tag. FIG. 5b illustrates a stack of the aforementioned one-byte labels in a packet and the format of the one-byte label. FIG. 5c illustrates a stack of the aforementioned super label in a packet and the format of the super label.

When there is a failure in a link within the virtualized switch, some paths from the virtualized server to the external devices may be affected. Some servers in the virtualized server may need to react by associating a different stack of labels to the external devices. That is a time-critical operation in view of high availability, and the frequency of that operation should be minimized. In our preferred embodiment, the disclosed method further comprises a step of configuring on each switch at least one link aggregation with the downlink switch ports. Each switch is configured with one or more link aggregations of its downlink switch ports, referred to as downlink link aggregations. Each of the downlink link aggregations consists of only the downlink switch ports that are connected to a same switch in a lower tier. For example, as in FIG. 6, the switch 22 has four downlink switch ports, switch ports 7-8 connected to switch 31, switch ports 5-6 connected to switch 32. Then, there can be two downlink link aggregations, downlink link aggregation 198 of downlink switch ports 7-8, another downlink link aggregation 199 of downlink switch ports 4-5. The advantage of the embodiment is that in the case of a member switch port failure, a downlink link aggregation is still operational and there is no need to reconfigure the stack of labels or paths on the servers. There is a need to reconfigure the stack of labels or paths on the servers only when a whole downlink link aggregation goes down, which would be the case of a switch failure, e.g., switch 31 going down.

A typical switch supports the redirection of traffic to a physical switch port and also a logical switch port, i.e., link aggregation. In our preferred embodiment, the label value may also indicate a physical switch port or a link aggregation to be selected. When we refer to mapping a label value to an egress switch port, the egress switch port can be a physical switch port or a logical switch port. When the configured forwarding rules direct a packet to a logical switch port, eventually the switch will select one member switch port of the link aggregation to send out the packet. Also, since a link aggregation may contain one member switch port or may contain more than one member switch ports, in general, redirection of traffic to a link aggregation is to mean redirection of traffic to a physical switch port, i.e., link aggregation with one member switch port, or a link aggregation with more than one member switch ports.

Figure 6:
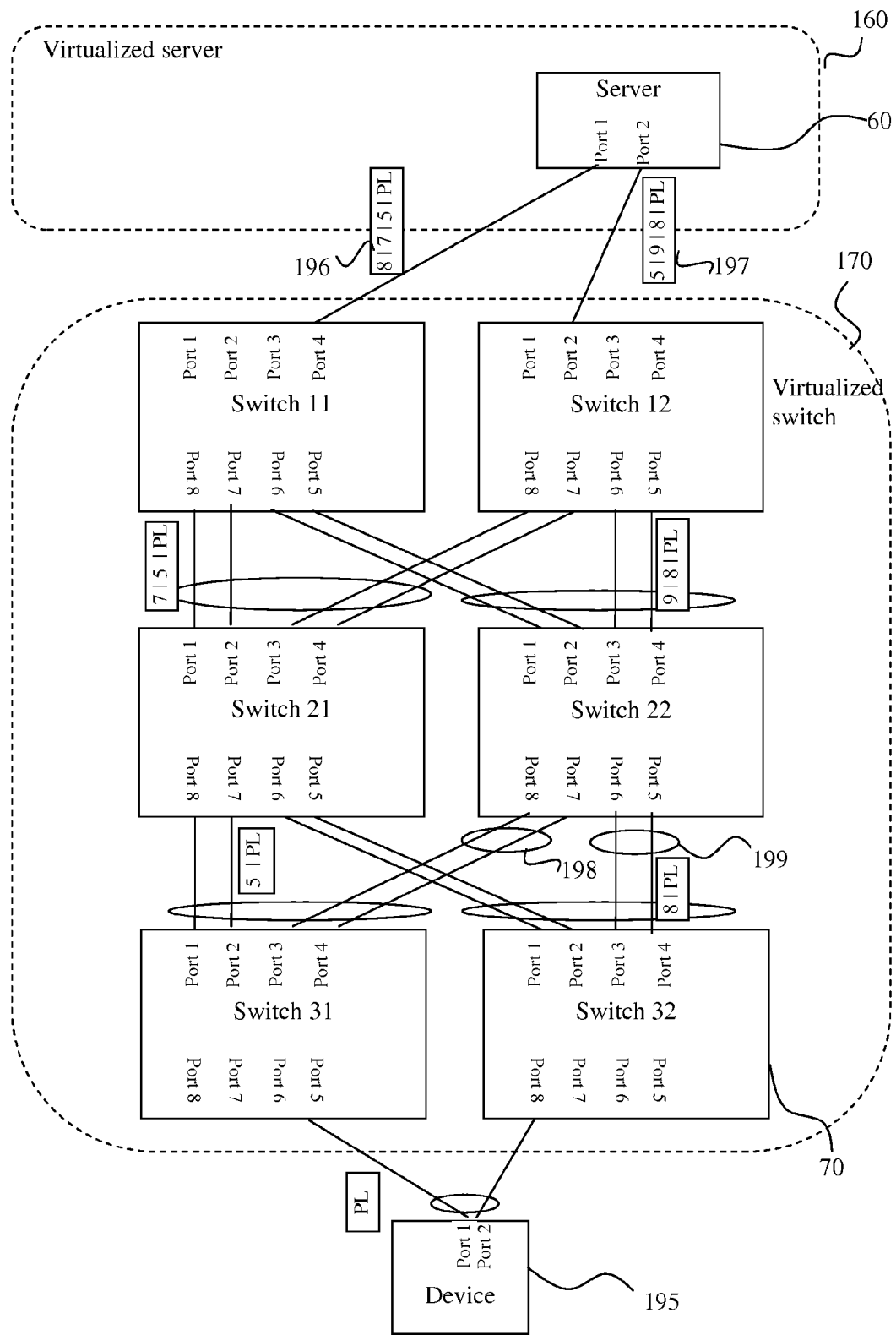
FIG. 6 illustrates how packets are forwarded from a server to an external device.

In FIG. 6, a server 60 inserts a stack of labels into packet 196 and another stack of labels into packet 197. For packet 196, the stack of labels directs the packet out on port 8 of switch 11, port 7 of switch 21, and port 5 of switch 31 to reach the external device 195, assuming a label value M directly mapped to port M. For packet 197, a label value 5 on switch 12 directs the packet out on port 5. Suppose a label value 9 on switch 22 represents a logical switch port or link aggregation 199. Packet 197 is directed out on either port 5 or port 6 of switch 22 decided by the link aggregation traffic distribution algorithm configured on switch 22. A label value 8 on switch 32 directs the packet out on port 8.

FIG. 6 also illustrates that it is desirable to have an external device connected to multiple switches via a link aggregation so as to have a redundant path in case of a switch failure. It is also desirable to have a server connected to multiple switches so as to have a redundant path in case of a switch failure.

Figure 7:
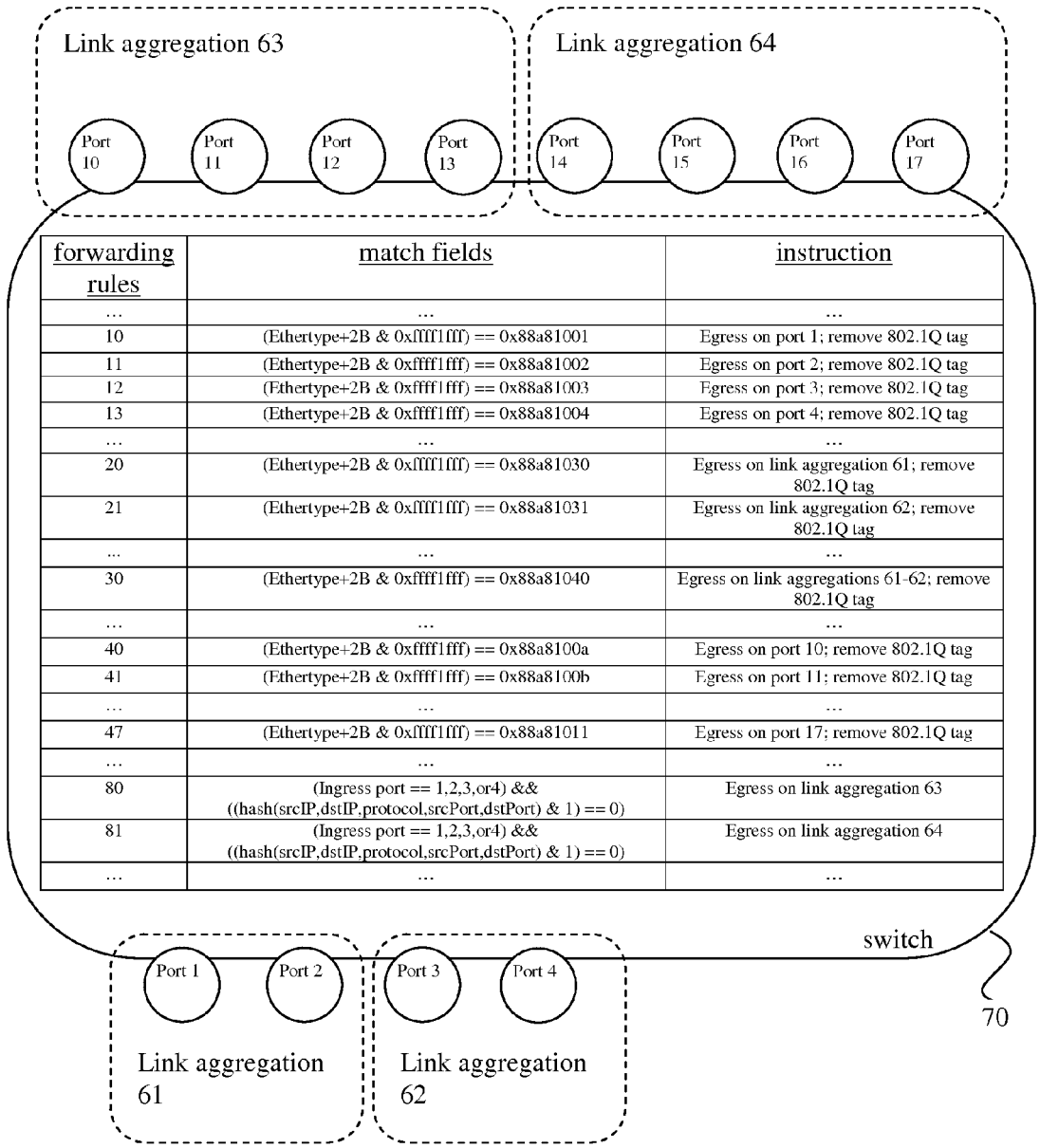
FIG. 7 illustrates an embodiment of forwarding rules on a switch.

FIG. 7 illustrates using forwarding rules to direct packets with labels out on downlink link aggregations. Forwarding rules 20-21 direct packets to downlink link aggregations 61-62. Note that forwarding rules 10-13 may co-exist. The label value decides whether physical switch port or link aggregation is to be selected.

A typical switch may also support the redirection of traffic to one or more egress switch ports. In our preferred embodiment, the label value may also indicate one or more switch ports to be selected. The mapping of a label value to one or more switch ports is exhibited in the forwarding rules configured on a switch. For example, in FIG. 7, forwarding rule 30 will multicast the packet to downlink link aggregations 61-62. In other words, a packet from a server may be replicated at one or more switches along its paths to multiple external devices, as a result of inserting a specific stack of labels at a server and configuring appropriate forwarding rules on the switches.

In our preferred embodiment, a server is allowed to communicate to another server via the virtualized switch. That is a nice property considering the servers may need to exchange some house-keeping information. To enable server-to-server communication, the forwarding rules of forwarding packets based on labels inside packets on the switches should be flexible in letting the packets with labels, whether received from uplink switch ports or downlink switch ports, to be forwarded out on an uplink switch port or, of course, a downlink switch port. Considering the fact that there are already forwarding rules that forward packets received from downlink switch ports to uplink link aggregations, the forwarding rules of forwarding packets based on labels inside packets must take precedence. The label values can be mapped to uplink switch ports or downlink switch ports. A server may communicate to another server by inserting into a packet a stack of labels that directs the packet through some egress downlink switch ports and egress uplink switch ports. When a forwarding rule maps a label value into an egress uplink switch port, the uplink switch port had better be a physical switch port, not a link aggregation because the link aggregation may have member switch ports connected to more than one switch at a higher tier or more than one server. The stack of labels is supposed to dictate the specific switches or the specific server along the path.

In FIG. 7, the forwarding rules 40-47 may forward packets to uplink switch ports 10-17, respectively. The forwarding rules 40 -47 are in preferred positions over the forwarding rules 80-81, assuming the smaller the rule number, the higher the preference. A packet that may satisfy both forwarding rule 40 and forwarding rule 80 will use the instructions associated with forwarding rule 40.

Figure 8:
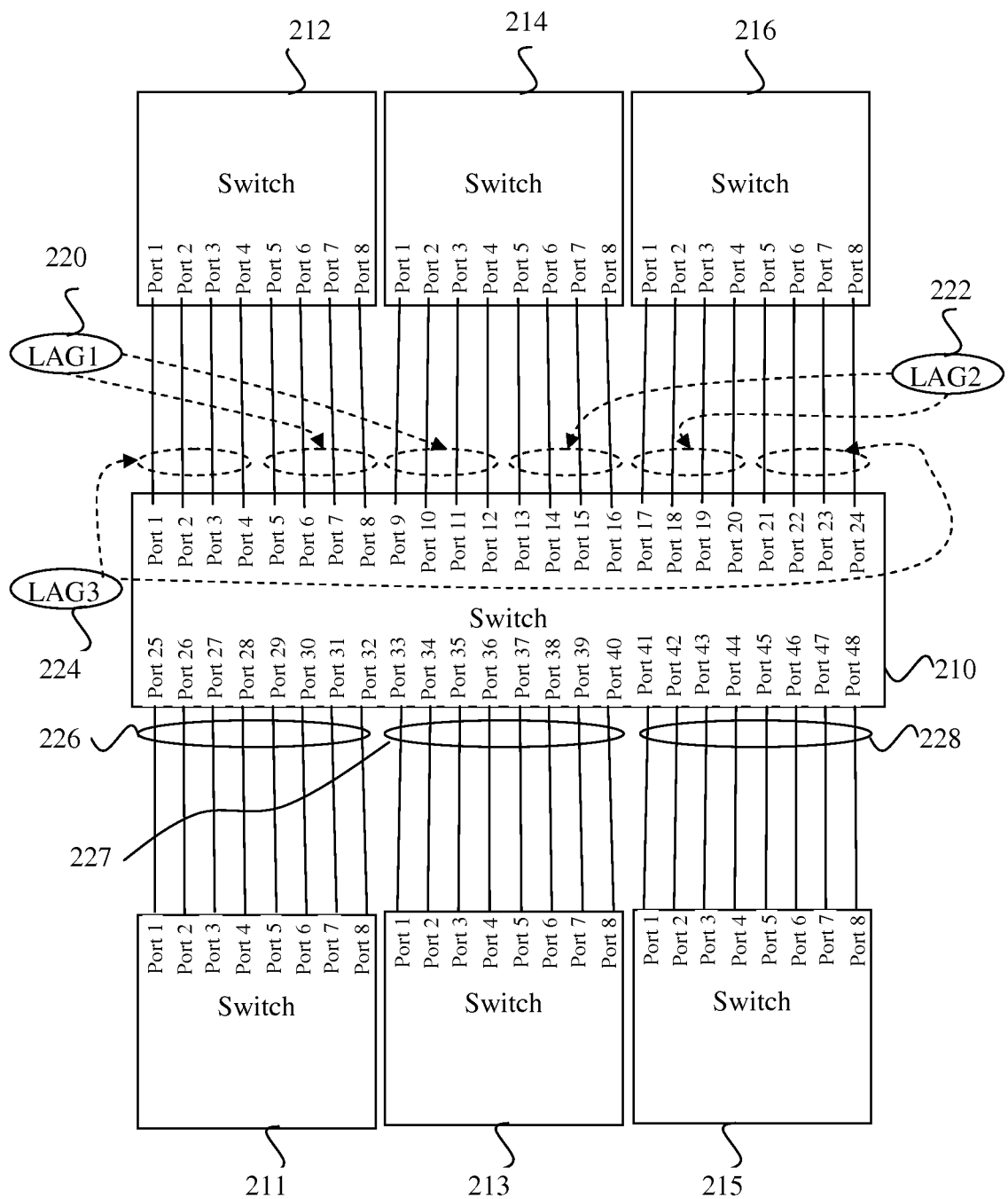
FIG. 8 illustrates an embodiment of configuring link aggregations.

FIG. 8 illustrates an embodiment of assignment of member switch ports to link aggregations. Support that the switch 210 can support up to eight member switch ports in a link aggregation. Ports 1-24 of switch 210 are uplink switch ports. It is desirable to have each uplink link aggregation consist of member switch ports connected to two switches. Therefore, it is desirable to have uplink link aggregation 220 with ports 5-12, uplink link aggregation 222 with ports 13-20, and uplink link aggregation 224 with ports 1-4 and 21-24. Ports 25-48 of switch 210 are downlink switch ports. It is desirable to have each downlink link aggregations consist of member switch ports connected to only one switch. Therefore, it is desirable to have downlink link aggregation 226 with ports 25-32, downlink link aggregation 227 with ports 33-40, and downlink link aggregation 228 with ports 41-48. The configurations would enable minimal reconfigurations responding a single failure. For example, when switch 212 goes down, link aggregation 220 and link aggregation 224 are still operational. When switch port 25 of switch 210 goes down, the link aggregation 226 is still operational. The servers need to be reconfigured not to use any stack of labels utilizing switch 211 only when switch 211 goes down.

It is an object of this invention that any external device is able to reach any other external device. An external device may do so first by reaching out to the virtualized server and by letting the virtualized server direct the packets to the destined external device. To support that, the switches should be sufficiently connected to enable packets from any of the servers to reach any external device connected to a downlink switch port on any switch. On the other hand, it may not be necessary to enable packets from any external device to reach any of the servers.

Figure 9A:
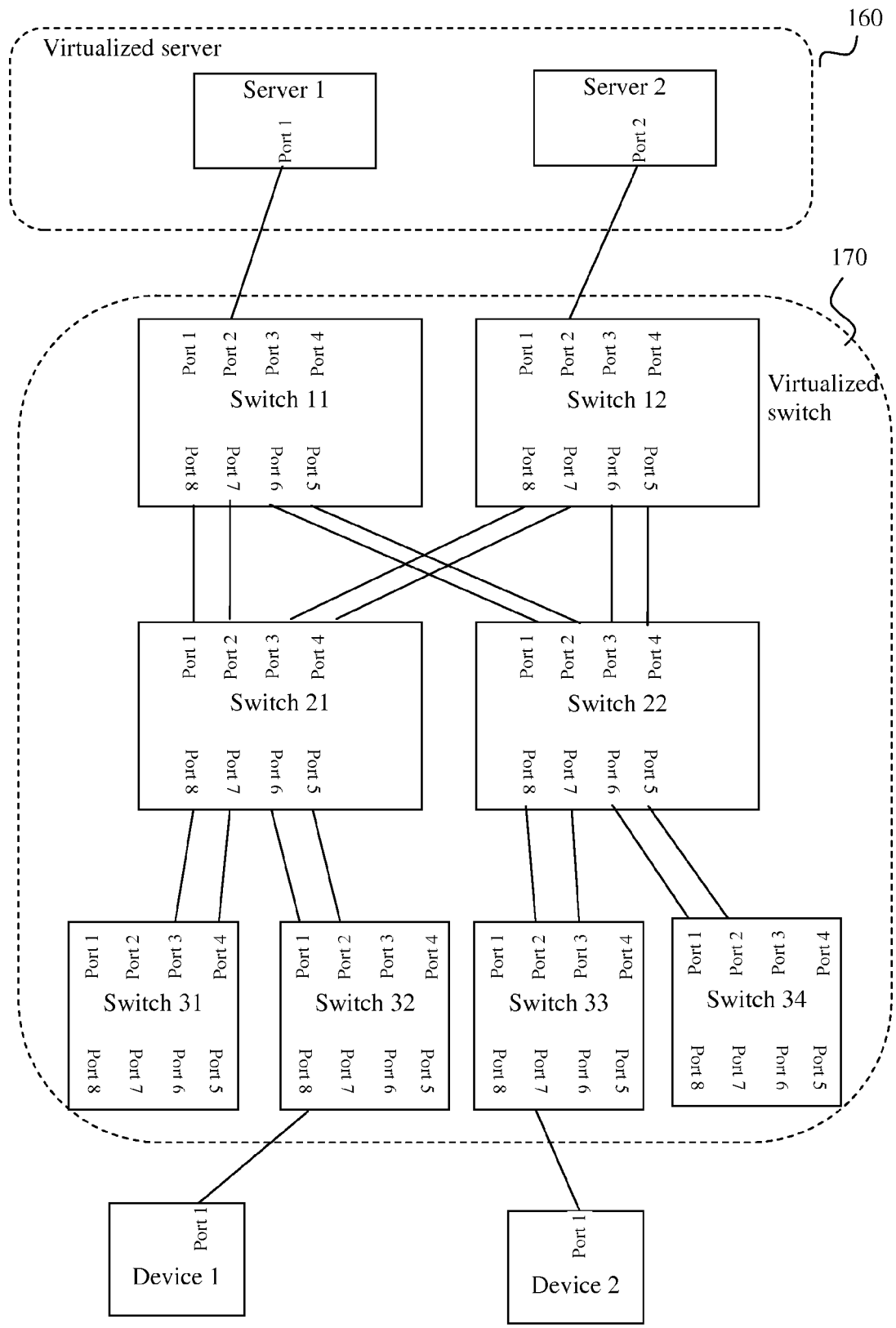
FIG. 9a illustrates a strict topology of interconnecting switches.
Figure 9B:
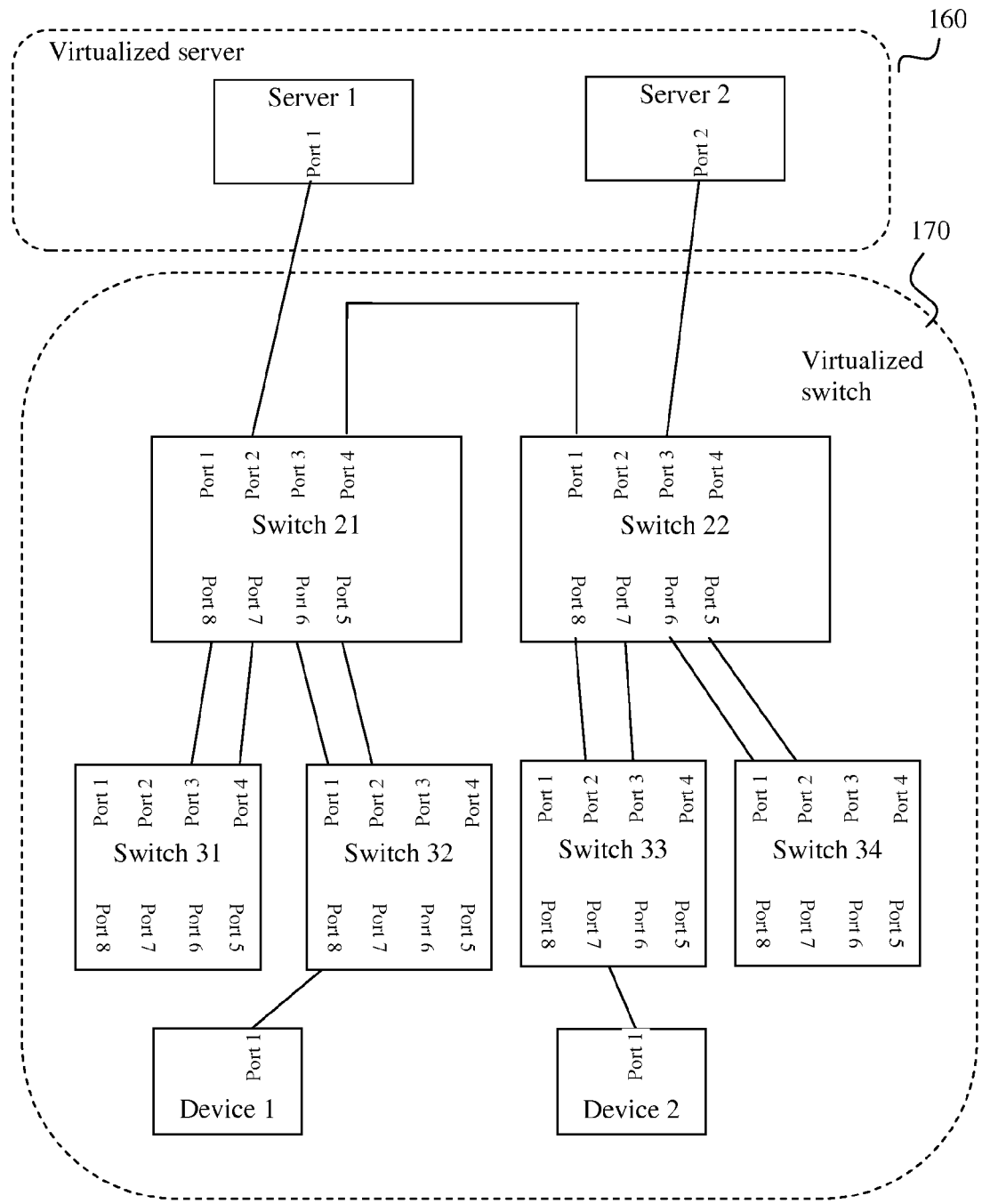
FIG. 9b illustrates a less strict topology of interconnecting switches.

In FIG. 9*a*, the switch 11 and switch 12 provide sufficient connectivity as switch 21 and switch 22 are otherwise not connected. When there is no direct connectivity among switches in the same tier, switches in a higher tier should provide the needed connectivity. However, it is sometimes desirable, e.g., for cost reduction, to provide direct connectivity among switches in the same tier, as in FIG. 9*b*. Switch ports inter-connected to two switches in the same tier should be treated as downlink switch ports on the two switches. In FIG. 9*b*, switch port 4 of switch 21 is treated as a downlink switch port on switch 21, and so should switch port 1 of switch 22 be treated as a downlink switch port on switch 22. The packets from the external device 1 are not able to reach server 2 because the switch port 4 of switch 21 is treated as a downlink switch port. On the other hand, packets from server 1 are able to reach external device 1 and external device 2. Therefore, external device 1 is still able to communicate to external device 2 via server 1.

Multiple connections between two switches in the same tier may be configured to be a downlink link aggregation from each of the two switches' viewpoint. For example, suppose that there is another connection between port 3 of switch 21 and port 2 of switch 22. A downlink link aggregation can be configured with ports 3-4 on switch 21, and another downlink aggregation can be configured with ports 1-2 on switch 22.

Switches are organized in tiers. It may seem more organized to have switches in one tier only connected to switches in its next higher tier and switches in its next lower tier. However, other less strict topologies are also feasible. For example, it is also feasible to have a switch in one tier connected to switches in two or more higher tiers. It is also feasible to have a switch in one tier connected to switches in two or more lower tiers. It is also feasible to have a switch in one tier connected to a switch in a higher tier other than its next higher tier. It is also feasible to have a switch in one tier connected to a switch in a lower tier other than its next lower tier. It is also feasible to have external devices connected to downlink switch ports of switches in tiers other than the lowest tier. It is also feasible to have external devices connected to downlink switch ports of switches in multiple tiers. It is also feasible to have servers connected to uplink switch ports of switches in tiers other than the highest tier. It is also feasible to have servers connected to uplink switch ports of switches in multiple tiers.

On the other hand, when switches are physically connected in less strict topologies and when it is desirable to operate the switches logically in the strict topology where switches in one tier are only connected to switches in its next higher tier and switches in its next lower tier, pruning can be used. Pruning here refers to logically ignoring some physical connections among the switches so that the logical connections of the switches adhere to the strict topology. Pruning can be achieved by excluding the pruned switch ports from being neither downlink switch ports nor uplink switch ports. The pruned switch ports are therefore ignored in the traffic distribution. Pruning can also be achieved by configuring the pruned switch ports to enter disabled state. The management module may apply pruning when it determines problematic to use some physical connections among the switches for traffic distribution.

In this invention, a server in the virtualized server needs to support the aforementioned label insertion functionality. In one embodiment, the server supports one or more VMs. Each VM supports a networking software module. The networking software module implements the label insertion functionality. Typically, when the VM runs an operating system, the networking software module runs inside of the operating system of the VM. When the VM does not run an operating system but runs a simple executive, the networking software module runs as a part of the simple executive. In another embodiment, the server supports one or more VMs and also a virtual switch software module. The VMs are connected via their virtual network interfaces to the virtual switch software module. Physical network interfaces of the server are also logically connected to the virtual switch software module. The virtual switch software module is capable of forwarding packets among the virtual network interfaces and physical network interfaces. The virtual switch software module implements the label insertion functionality. The virtual switch software module inserts labels into packets when the packets are sent out on the physical network interfaces of the server. Typically, the virtual switch software module runs inside of the hypervisor of the server. Typically, the virtual switch software module also supports OpenFlow. The management module can therefore configure information about external devices and labels onto the virtual switch software module via OpenFlow.

The embodiments described above are illustrative examples and it should not be construed that the present invention is limited to these particular embodiments. Thus, various changes and modifications may be effected by one skilled in the art without departing from the spirit or scope of the invention as defined in the appended claims.

The invention claimed is:

1. A method for producing a system capable of load-balancing network traffic, the method comprising:
provisioning a plurality of switches, the plurality of switches organized in one or more tiers, wherein a switch in a tier, of the plurality of switches, comprising one or more uplink switch ports and one or more downlink switch ports, is connected to zero or more switches in at least one higher tier via the one or more uplink switch ports and connected to zero or more switches in at least one lower tier via the one or more downlink switch ports;
provisioning a plurality of servers, wherein each of the plurality of servers is connected to at least one of the plurality of switches via at least one of the one or more uplink switch ports of the at least one of the plurality of switches;
configuring on each of the plurality of switches at least one uplink link aggregation, each of the at least one uplink link aggregation consisting of at least one of the one or more uplink switch ports;
configuring on each of the plurality of switches to forward a packet received from any of the one or more downlink switch ports out through one of the at least one uplink link aggregation, the one of the at least one uplink link aggregation being selected based on content of the packet received from any of the one or more downlink switch ports;
configuring on each of the plurality of servers to insert one or more labels into a packet to be sent out through at least one of the plurality of switches; and
configuring on each of the plurality of switches to forward a packet received from any of the one or more uplink switch ports out through at least one of the one or more downlink switch ports and remove the first of the one or more labels from the packet received from any of the one or more uplink switch ports when the at least one of the one or more downlink switch ports is selected based on the first of the one or more labels in the packet received from any of the one or more uplink switch ports.

2. The method of claim 1, further comprising configuring on each of the plurality of switches to preferentially forward a packet received from any of the one or more uplink switch ports and the one or more downlink switch ports out through at least one of the one or more uplink switch ports and remove the first of the one or more labels from the packet received from any of the one or more uplink switch ports and the one or more downlink switch ports when the at least one of the uplink switch ports is selected based on the first of the one or more labels in the packet received from any of the one or more uplink switch ports and the one or more downlink switch ports.

3. The method of claim 1, wherein a downlink switch port, of the one or more downlink switch ports, is a member of a downlink link aggregation, of at least one downlink link aggregation, each of the at least one downlink link aggregation consisting of at least one of the one or more downlink switch ports, the at least one of the one or more downlink switch ports connected to a same switch, of the plurality of switches.

4. The method of claim 1, wherein an uplink link aggregation, of the at least one uplink link aggregation, consists of at least two of the one or more uplink switch ports, wherein the at least two of the one or more uplink switch ports are connected to at least two switches in at least one higher tier.

5. The method of claim 1, wherein switch ports of a switch, of the plurality of switches, in a tier connected to another switch, of the plurality of switches, in the same tier are treated as downlink switch ports.

6. The method of claim 1, wherein the plurality of servers are connected to the switches in the highest tier via the one or more uplink switch ports of the switches in the highest tier.

7. The method of claim 1, wherein the plurality of switches are sufficiently connected to enable packets from any of the plurality of servers to reach any external device connected to a downlink switch port on a switch, of the plurality of switches.

8. The method of claim 1, wherein one or more physical connections among the plurality of switches are logically pruned by excluding switch ports associated with the one or more physical connections from being uplink switch ports and downlink switch ports.

9. A method for producing a system capable of load-balancing network traffic, the method comprising:
provisioning a plurality of switches, the plurality of switches organized in one or more tiers, wherein a switch in a tier, of the plurality of switches, comprising one or more uplink switch ports and one or more downlink switch ports, is connected to zero or more switches in at least one higher tier via the one or more uplink switch ports and connected to zero or more switches in at least one lower tier via the one or more downlink switch ports;
provisioning a plurality of servers, wherein each of the plurality of servers is connected to at least one of the plurality of switches via at least one of the one or more uplink switch ports of the at least one of the plurality of switches;
configuring on each of the plurality of switches at least one uplink link aggregation, each of the at least one uplink link aggregation consisting of at least one of the one or more uplink switch ports;
configuring on each of the plurality of switches to forward a packet received from any of the one or more downlink switch ports out through one of the at least one uplink link aggregation, the one of the at least one uplink link aggregation being selected based on content of the packet received from any of the one or more downlink switch ports;
configuring on each of the plurality of servers to insert one or more labels into a packet to be sent out through at least one of the plurality of switches;
configuring on each of the plurality of switches to forward a packet received from any of the one or more uplink switch ports out through at least one of the one or more downlink switch ports when the at least one of the one or more downlink switch ports is selected based on the one or more labels in the packet received from any of the one or more uplink switch ports; and
configuring each switch in the lowest tier, of the plurality of switches, to remove the one or more labels in the packet received from any of the one or more uplink switch ports when the at least one of the one or more downlink switch ports is selected based on the one or more labels in the packet received from any of the one or more uplink switch ports.

10. The method of claim 9, wherein each of the one or more labels is one byte.

11. The method of claim 9, wherein a downlink switch port, of the one or more downlink switch ports, is a member of a downlink link aggregation, of at least one downlink link aggregation, each of the at least one downlink link aggregation consisting of at least one of the one or more downlink switch ports, the at least one of the one or more downlink switch ports connected to a same switch, of the plurality of switches.

12. A system capable of load-balancing network traffic, the system comprising:
   a plurality of switches, the plurality of switches organized in one or more tiers, wherein a switch in a tier, of the plurality of switches, comprising one or more uplink switch ports and one or more downlink switch ports, is connected to zero or more switches in at least one higher tier via the one or more uplink switch ports and connected to zero or more switches in at least one lower tier via the one or more downlink switch ports; and
   a plurality of servers, wherein each of the plurality of servers is connected to at least one of the plurality of switches via at least one of the one or more uplink switch ports of the at least one of the plurality of switches;
   wherein each of the plurality of switches is configured with at least one uplink link aggregation, each of the at least one uplink link aggregation consisting of at least one of the one or more uplink switch ports;
   wherein each of the plurality of switches is configured to forward a packet received from any of the one or more downlink switch ports out through one of the at least one uplink link aggregation, the one of the at least one uplink link aggregation being selected based on content of the packet received from any of the one or more downlink switch ports;
   wherein each of the plurality of servers is configured to insert one or more labels into a packet to be sent out through at least one of the plurality of switches;
   wherein each of the plurality of switches is configured to forward a packet received from any of the one or more uplink switch ports out through at least one of the one or more downlink switch ports and remove the first of the one or more labels from the packet received from any of the one or more uplink switch ports when the at least one of the one or more downlink switch ports is selected based on the first of the one or more labels in the packet received from any of the one or more uplink switch ports.

13. The system of claim 12, wherein each of the plurality of switches is configured to preferentially forward a packet received from any of the one or more uplink switch ports and the one or more downlink switch ports out through at least one of the one or more uplink switch ports and remove the first of the one or more labels from the packet received from any of the one or more uplink switch ports and the one or more downlink switch ports when the at least one of the one or more uplink switch ports is selected based on the first of the one or more labels in the packet received from any of the one or more uplink switch ports and the one or more downlink switch ports.

14. The system of claim 12, wherein a downlink switch port, of the one or more downlink switch ports, is a member of a downlink link aggregation, of at least one downlink link aggregation, each of the at least one downlink link aggregation consisting of at least one of the one or more downlink switch ports, the at least one of the one or more downlink switch ports connected to a same switch, of the plurality of switches.

15. The system of claim 12, wherein an uplink link aggregation, of the at least one uplink link aggregation, consists of at least two of the one or more uplink switch ports, wherein the at least two of the one or more uplink switch ports are connected to at least two switches in at least one higher tier.

16. The system of claim 12, wherein switch ports of a switch, of the plurality of switches, in a tier connected to another switch, of the plurality of switches, in the same tier are treated as downlink switch ports.

17. The system of claim 12, wherein the plurality of servers are connected to the switches in the highest tier via the one or more uplink switch ports of the switches in the highest tier.

18. The system of claim 12, wherein the plurality of switches are sufficiently connected to enable packets from any of the plurality of servers to reach any external device connected to a downlink switch port on a switch, of the plurality of switches.

19. The system of claim 12, wherein one or more physical connections among the plurality of switches are logically pruned by excluding switch ports associated with the one or more physical connections from being uplink switch ports and downlink switch ports.

20. The system of claim 12, wherein a label, of the one or more labels, is a four-byte field after the source MAC (Media Access Control) address field in a packet, the label comprising two or more values indicating switch ports to be selected in the next two or more switches that are to receive the packet respectively, of the plurality of switches.

* * * * *